United States Patent [19]
Reist

[11] Patent Number: 5,755,316
[45] Date of Patent: May 26, 1998

[54] COMMISSIONING SYSTEM

[75] Inventor: Walter Reist, Hinwil, Switzerland

[73] Assignee: SFT AG Spontanfoertechnik, Weinfelden, Switzerland

[21] Appl. No.: 613,079

[22] Filed: Mar. 8, 1996

[30] Foreign Application Priority Data

Mar. 8, 1995 [CH] Switzerland .............. 00 659/95

[51] Int. Cl.$^6$ ............................................. B65G 37/00
[52] U.S. Cl. ............................ 198/349.6; 198/349.5; 198/358
[58] Field of Search .................... 198/358, 349, 198/349.5, 349.6, 349.7, 349.8, 349.9; 414/313

[56] References Cited

U.S. PATENT DOCUMENTS

| | | | |
|---|---|---|---|
| 3,627,153 | 12/1971 | Brummett et al. | 198/349.6 |
| 4,672,553 | 6/1987 | Goldberg | 198/349 X |

FOREIGN PATENT DOCUMENTS

| | | | |
|---|---|---|---|
| 0167814 | 8/1985 | Japan | 198/349.5 |
| 0208425 | 8/1988 | Japan | 198/349.5 |
| 0132014 | 5/1990 | Japan | 198/349.5 |
| 2110448 | 6/1983 | United Kingdom | 198/349.9 |

Primary Examiner—James R. Bidwell
Attorney, Agent, or Firm—Walter C. Farley

[57] ABSTRACT

A commissioning system has a substantially random arrangement or array of positions (1 to 53) associated with specific articles or objects. It also has a removal device, with a guidance system (60) and a flexible conveying member (67) movable in push or pull manner within the system. The guidance system (60) and conveying member (67) are so designed that the head end of the conveying member (67) is movable from an outlet point (65) to the removal side of each position (1 to 53) of the array of positions. For this purpose the guidance system (60) can be branched in tree-like manner from the outlet point (65) and switch points (61 to 64) are provided at the branching locations. At the head end of the conveying member (67) is provided a holder (68), which can hold the article for conveying purposes. At the head end of the conveying member (67) and/or in the vicinity of the removal side of the positions (1 to 53) are also provided device for taking over one or more articles from the holder (68). For controlling the system a computer (72) with a memory (73) for a data bank (75) is provided, the data bank (75) being able to associate features of articles with specific positions and with the latter are associated specific conveying data, such as the distance (D) from the outlet point and switch point positions (61 to 64). By incorporating an inlet point (66) and suitably equipping the device, the system can also be made usable for the classifying or arranging of articles at the positions (1 to 53).

15 Claims, 4 Drawing Sheets

COMMISSIONING SYSTEM

FIELD OF THE INVENTION

The invention relates to a commissioning system with an array of positions associated with particular objects or articles and a removal device for the controlled removal of articles or objects from said positions.

BACKGROUND OF THE INVENTION

In known commissioning systems normally the array of positions on which are kept ready e.g. in each case one type of article for commissioning, is largely determined by the design and construction of the removal devices. For example, removal devices are known, which are horizontally displaceable on a vertically displaceable rail, which consequently serve a mainly vertical surface on which must be arranged the removal sides of the positions, i.e. the articles to be removed. The removal surface has a layout parallel to the rail of the removal device and which usually represents either a straight line, a circle or part of a circle. In other words, the array of positions for the articles to be commissioned must be such that their removal sides are arranged substantially on a common, vertical, planar, cylindrical or cylindrical part-like removal surface.

Generally in such a system the articles are supplied to the positions from an addition side, which faces the removal side, it being possible for the positions to be inclined in such a way that the supplied articles are conveyed by gravity from the addition side to the removal side. Such a commissioning system is e.g. decsribed in EP-457158.

For the aforementioned reasons, known commissioning systems require a considerable amount of space and can also only be extended with a considerable space requirement and both for the construction and for an extension there must be a space having a predetermined shape. These systems are in particular non-integratable or can only be integrated with very considerable difficulty into given buildings.

SUMMARY OF THE INVENTION

An object of the invention is to provide a commissioning system substantially comprising an array of positions and a removal device, the latter to be designed in a flexible manner so as to permit an almost random array or arrangement of positions. The system is also to be randomly extendable without significant restrictions with respect to the spatial design. The system is to be simple from the construction and control standpoints. The removal device of the system is to be such that it is also possible to use it as an arranging device or to easily reequip it as such, i.e. it is also to be usable to arrange the articles in their allocated positions.

A further object of the invention is to provide a method for operating the commissioning system according to the invention, said method being performable for removing and/or arranging articles with respect to the positions and which is to be fully automatable.

The commissioning system according to the invention has an array of positions associated with specific articles, the positions being randomly distributable in space. The removal device of the commissioning system according to the invention and which can also be used as a classifying or arranging device, essentially comprises a guidance system and a flexible transporting or conveying member, which can be pushed into this guidance system from at least one outlet point (or outlet/inlet point) and then drawn at least partly out of the guidance system. The guidance system can branch in tree-like manner from the outlet point and leads into the area of the removal side of all the positions provided or past the same, in such a way that the outlet point is connected to each of the provided positions by the guidance system and therefore each of the positions is reachable with the top or head end of the conveying member, if the latter is pushed to a greater or lesser extent into the guidance system. The conveying member carries at its head end, which is never drawn out of the guidance system, a holding means, which e.g. projects out of the guide through a longitudinal slot therein and which can entrain one or more articles. In addition, on the head end of the conveying member and/or at the individual positions, there are mechanical and/or sensory interaction means, which on removing and/or arranging an article allow or actively bring about the transfer of the article from the holding means to the position. Such interaction means can also bring about the stopping of the head end of the conveying member at an intended position.

A removal process for an article of a specific type takes place in the following way in the commissioning system according to the invention. The head end of the conveying member positioned somewhere in the guidance system is moved by pushing and/or pulling the conveying member against the particular position which is associated with the article or articles to be removed and the conveying member is stopped when the head end has reached the position. Then through the interaction means of the conveying member and/or the position one or more articles is transferred from the position to the conveying member holding means or is taken over from the latter. The head end of the conveying member is then brought by the pulling thereof to the outlet point, where it is stopped and the removed article is taken from the holding means with the aid of further interaction means or by personnel.

An arrangement process of an article of a specific type takes place in the following way in the commissioning system according to the invention. The head end of the conveying member positioned somewhere in the guidance system is moved against an inlet point by pulling the conveying member and the latter is stopped when the head end has reached the inlet point. One or more articles is then transferred by personnel or corresponding interaction means to the holding means or is taken over from the latter. The conveying means is then pushed in the guidance system until its head end reaches the position associated with the article to be arranged and is then stopped. The article is then transferred with the aid of interaction means from the holding means to the position or is correspondingly taken over from it.

For its movements the conveying member is driven by a stationary drive, which is advantageously located on the side opposite to the guidance system of at least one outlet/inlet point. The conveying member is e.g. a chain-like structure, which can be operated in both push and pull operation. The guide is e.g. substantially tubular and has an elongated slot, through which project the holding means located at the head end of the conveying member and optionally also interaction means. The guidance system has at branches switch points with a controllable switch box or the head of the conveying member has control means, which direct the conveying member at a guide branch into the intended guide part.

The commissioning system also has a computer and a memory for a data bank. The data bank contains data through which on the one hand, not variable by the operator, positions and inlet/outlet points and corresponding conveying data (e.g. distance between the drive and the specific position or inlet/outlet point, as well as corresponding point positions) are associated with one another, and on the other, advantageously variable by the operator, positions and inputtable or readable features of articles are associated with one another. The computer processes inputted article features of an article or several articles to be removed from the system or inputted features, recognized by a corresponding sensor, of an article to be arranged in the system with the aid of the data bank to control data for the conveying and transfer interaction and on the basis of said data and according to a calculated schedule controlled by an internal clock the conveying and interaction or drive of the conveying member, the switch box for the points and the interaction means. The time sequence of a removal or arrangement process can also be completely or partly controlled by a correspondingly arranged sensor system. The commissioning system according to the invention can be fully automatically operated in accordance with such an operating procedure using the described aids.

The commissioning system according to the invention is advantageously usable for the arrangement and removal of smaller articles such as e.g. compact disks, paperbacks, etc., the system being conceivable both as a library and as a production delivery means. The system control can be linked with a software checking of the presence or absence of articles in the system and with the arrangement and/or delivery of protocolling systems for producing e.g. invoices and debit notes.

The system control can e.g. also be designed in such a way that in accordance with a predetermined schedule (e.g. day/night) removal and arrangement alternate with one another and in the case of the lack of activity at the inlet point for removal processes automatically switching takes place to arrangement, the inlet point then being separated from the outlet point and is in the form of a buffer for articles to be arranged or classified.

Obviously systems are also conceivable making it possible to perform on a conveying path of the conveying member several interactions (removal and/or arranging processes) with different positions. For this purpose it is necessary to arrange in sequences groups of removal instructions and/or arrangement instructions corresponding to the position arrangement on specific conveying paths of the system and it is necessary to provide holding means and interaction means with which part of a group of conveyed articles can be transferred and the other part conveyed on and/or with which further articles can be added to already conveyed articles prior to conveying on.

BRIEF DESCRIPTION OF THE DRAWINGS

Embodiments of the commissioning system according to the invention and variants of holding and interaction means for the commissioning system according to the invention are described in greater detail hereinafter relative to the drawings, wherein.

DESCRIPTION OF THE PREFERRED EMBODIMENTS

Figure 1:
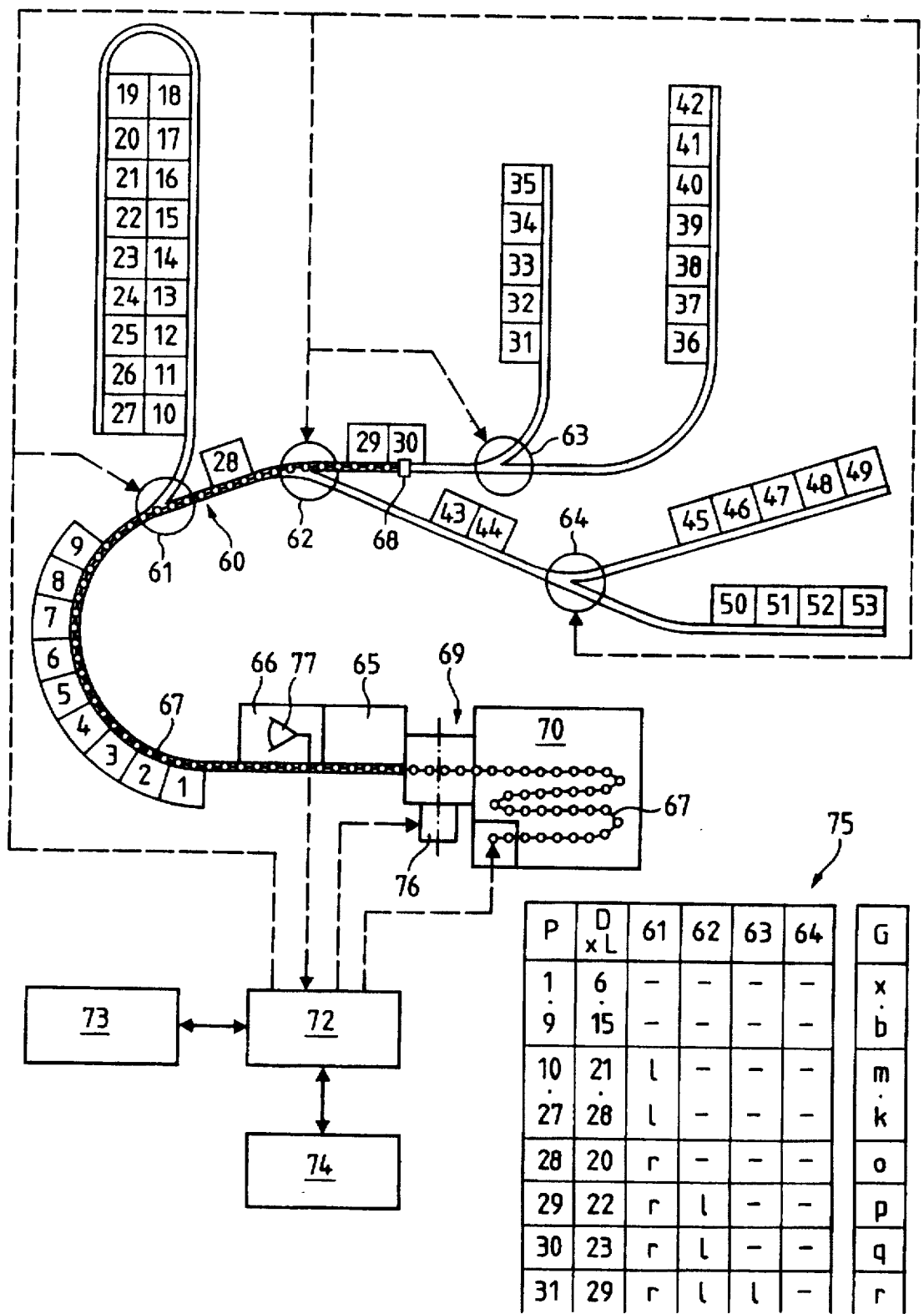
FIG. 1 is a diagram of an embodiment of the commissioning system according to the invention.

FIG. 1 shows an embodiment of the commissioning system according to the invention. The system has an array of positions 1 to 53 and a guidance system 60 branched in tree-like manner by switch points 61 to 64 and through which each of the positions 1 to 53 can be reached from an outlet point 65 (optionally combined with an inlet point 66) from the head end of a flexible conveying member 67 movable in the guides of the guidance system. Holding means 68 and optionally interaction means are provided at the head end of the conveying member 67. The conveying member is driven in push or pull manner by a drive 69, said drive being located on the other side of the outlet/inlet point (65 or 66) compared with the guidance system 60. The length of the conveying member 67 corresponds at least to the greatest distance (measured along the corresponding guidance path) between the drive 69 and the furthest removed position (position 27 in the drawing). For the end (tail end) of the conveying member 67 not located in the guidance system 60 is provided a store 70 for the conveying member in which is guided or approximately positioned part (without head end) of the member 67. The drive 69 is positioned between the conveying member store 70 and the outlet/inlet point 65/66.

The commissioning system of FIG. 1 also has a computer 72 with an input unit 73 (e.g. keyboard and screen) and an electronic memory 74 for a data bank 75. Elements 72, 73 and 74 can be a computer operated in isolated manner, forming part of a superconductor terminal or network. The data bank 75 is shown diagrammatically alongside the commissioning system. Through corresponding data sets (rows) positions and inlet/outlet points (column P) are associated with conveying data, e.g. column D for conveying distance between drive and position or inlet/outlet point and columns 61 to 64 for point positions and features of articles (column G) are associated with positions.

The computer 72 is also connected by data lines to the switch boxes for the switch points 61 to 64, to the control 76 of the drive 69, to the conveying member 67, if the latter has at its head end an active interaction means and/or sensors, and with a sensor 77 for the reading in of features of articles to be arranged, said sensor 77 being located in the vicinity of the inlet point 66. If the positions 1 to 53 have active interaction means or sensors, they must also be connected by not shown data lines to the computer 72.

The operation of the system according to FIG. 1 for the removal of e.g. one object with the features q functions in the following way. The head end of the conveying member 67, is in a random position known to the computer from the preceding operation (distance from the drive in length units L and points positions stored), e.g. at the outlet point 65 (distance 3×L, points positions not relevant). The features q are inputted at the input unit 73. The computer correlates the features q with the position 30 and the conveying parameters distance from the drive 23×L and points positions 61:r (right), 62:1 (left), 63 and 64 not relevant. By means of the starting position and the conveying parameters for the specific position, the computer produces control pulses for the locations of the points 61 (right) and 62 (left) and for the control 76 of the drive 69 (direction: push, distance: (23–3)×L), so that a length 20×L of the conveying member 67 is pushed into the guidance system 60. At the end of conveying (detected by sensors or determined according to the time required for conveying), the interaction means, the conveying member and/or the position arrived at for a removal interaction of the article are controlled from position 30. The drive of the conveying member is then activated, which draws the conveying means back to the starting point and then stops the same. For example, by a further interaction between the holding means and interaction means of the starting point, the article is transferred to or taken from the starting point. The instantaneous position of the holding means is stored by the computer. Thus, the removal process is at an end.

An arrangement process takes place correspondingly, if the sensor 77 reads the features (e.g. bar code) of an article to be arranged or same is inputted at the input unit 73 and the operations necessary for the control are activated.

The commissioning system according to FIG. 1 is operable as a removal and arranging system. This is clearly also necessary because the positions 10 to 27 are arranged in such a way that they are only accessible from the removal side, facing the guidance system, i.e. cannot have a supply side facing the removal side.

The commissioning system of FIG. 1 shows a bidimensional guidance system 60, having switch points 61 to 64, which in each case only have two positions. Obviously three-dimensional guidance systems are conceivable, also with switch points having more than two positions. Systems are also conceivable, whose guidance system has no branches, together with those having more than one guidance system associated with each conveying member (e.g. a guidance system for removal operations from the removal side of the positions and a further guidance system for the addition operations on the addition side of the positions).

The commissioning system shown in FIG. 1 has positions, whose removal side throughout faces the same side of the guide. Through a corresponding design of the holding means and/or the interaction means it is possible to locate the positions on different sides of the guides or to provide e.g. facing positions with respect to the guide.

Figure 2:
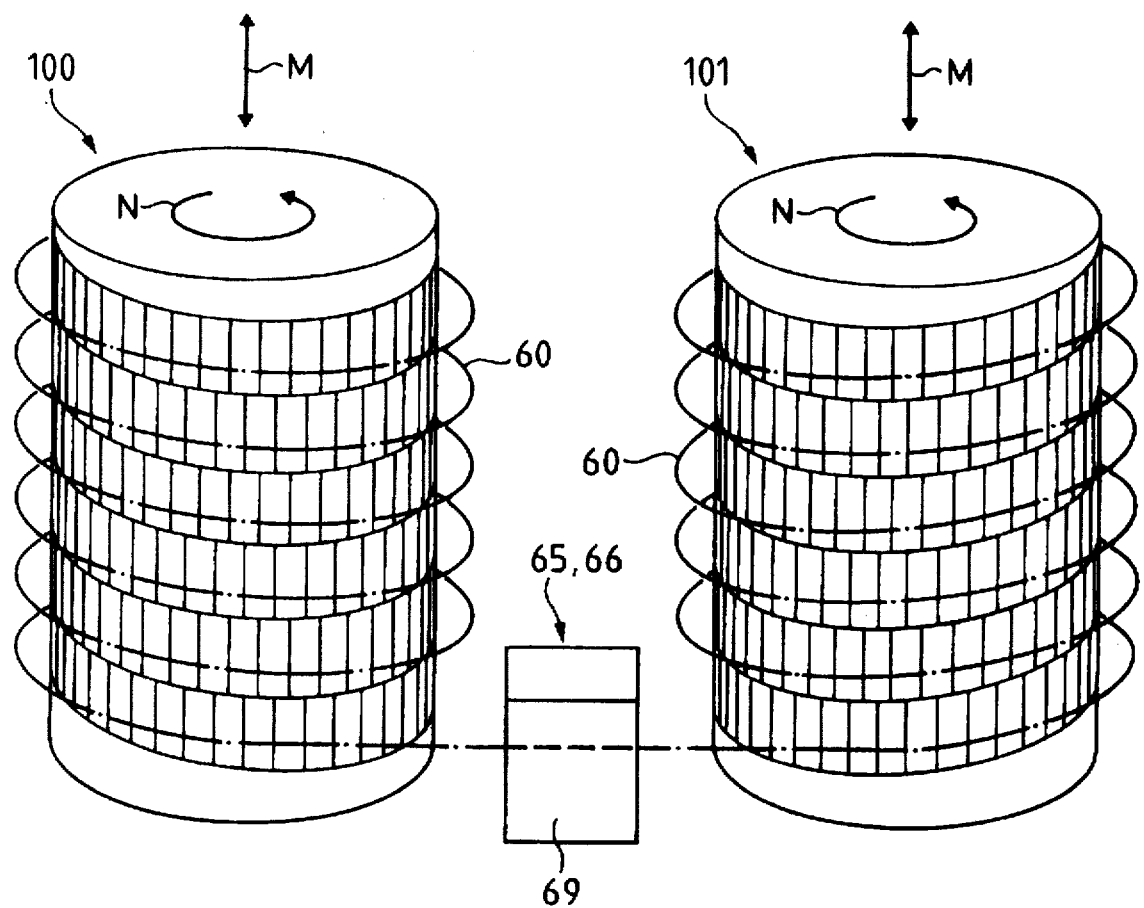
FIG. 2 is a further embodiment of the commissioning system according to the invention.

FIG. 2 illustrates certain of the aforementioned features differing from FIG. 1 and which can also be present in the commissioning system according to the invention. Of the system FIG. 2 only shows an array of positions in the form of two position cylinders 100, 101, on whose circumferential surfaces are located the removal sides of the individual positions in a spiral arrangement, a guidance system 60 serving the positions of the position cylinders, an inlet/outlet point 65/66 and at least one drive 69 for at least one, not shown conveying member located in the vicinity of the inlet/outlet point.

Clearly this is an embodiment of the commissioning system according to the invention extending over three dimensions and having no branches in the guidance system. The two position cylinders can in each case be served by a conveying member and in the vicinity of the inlet/outlet point 65/66 would then be provided corresponding conveying member stores for the tail ends of the conveying members.

However, it is also conceivable in a system according to FIG. 2, to equip both ends of a single conveying member as head ends and to provide in each case one of these for serving a position cylinder 100, 101, in such a way that during each movement one head end of the conveying member is drawn for serving one position cylinder in the guidance system and the other is pushed for serving the other position cylinder in the guidance system. The length of such a conveying member corresponds to the distance between the inlet/outlet point and the most remote position of the two position cylinders therefrom. To at least partly free the action possibilities of a system with a conveying member with two head ends from the forced dependent position thereof at all times, the position cylinders could also perform corresponding rotary movements (arrow N) and/or translatory movements (arrow M) and therefore guide a predetermined position to the corresponding head end of the conveying member.

CH-646762 (or U.S. Pat. No. 4,397,145) and CH-656683 describe ball joint link chains usable as conveying members in the commissioning system according to the invention. EP-57818 (or U.S. Pat. No. 4,467,707) discloses a corresponding drive, which is usable at one end of the conveying member and not, as shown in FIG. 1, between the two ends thereof.

Conveying members in the form of ball joint link chains and corresponding guides 60, drives 76 and conveying member stores 70 for use in the commissioning system according to the invention are also described in CH-626027 (or U.S. Pat. No. 4,151,754) and CH-655916 (or EP-91557, CA-1200584). The embodiment disclosed by CH-655916 has in the ball joint link chain a conductor, which can be used to supply an interaction means at the head end of the conveying member with control pulses or energy for a movement. The conductor can be in the form of an electrical conductor light guide, electric cable and also as a mechanical chord operable from the tail end of the conveying member for activating a corresponding interaction means.

Switch points for use in a commissioning system according to the invention are e.g. described in EP-316273 (or U.S. Pat. No. 4,899,666) or EP-387188 (or U.S. Pat. No. 5,036, 773).

FIGS. 3 to 8 show on a holding means and interaction means cooperating therewith, a process for removing an article from a position.

The represented holding means is a clamp 80 held by its own spring tension in the closed position, as described in EP-243582 (or U.S. Pat. No. 4,779,717). The conveying member is a ball joint link chain 81, as described in the aforementioned publications. The interaction means are in particular clamp opening links 82, which are moved by not shown positioning means into the movement path of the holding means 80 and also not shown positioning means with which an article 83 to be removed is positioned for its taking over by the holding means 80.

Figure 3:
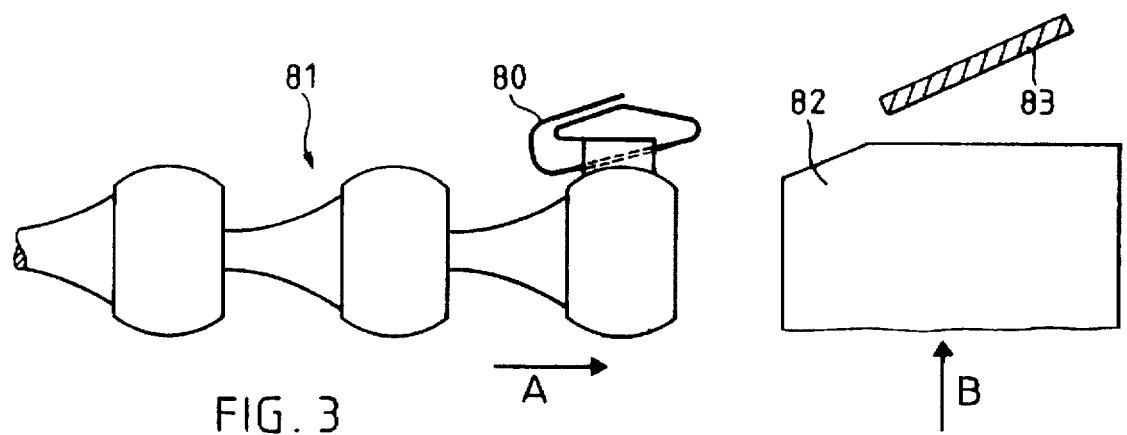
FIGS. 3 through 8 are schematic diagrams showing the transfer of an article to a holding means for the commissioning system according to the invention.
Figure 4:
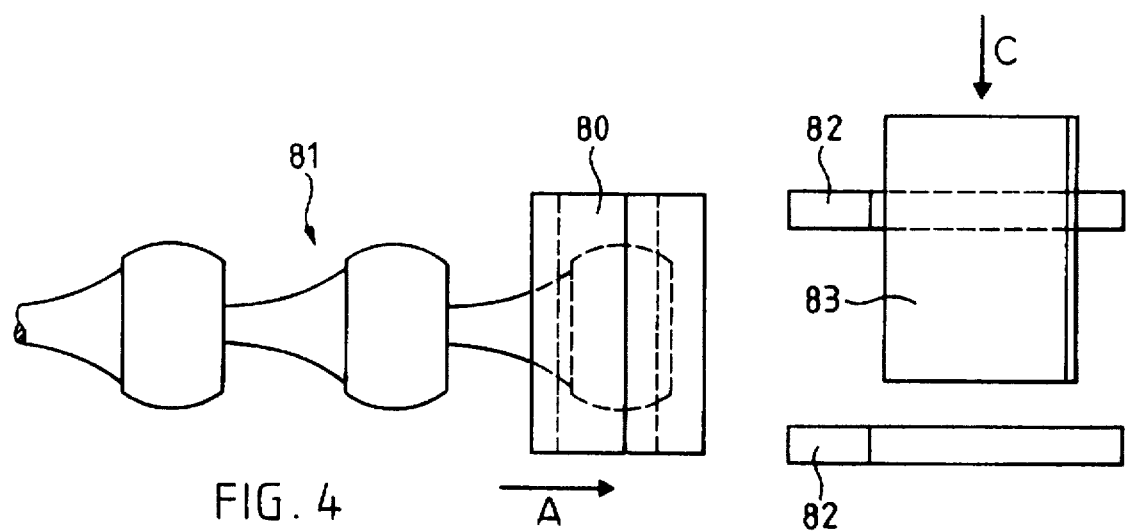

FIGS. 3 and 4 show the head end of the ball joint link chain 81 carrying the clamp 80 approaching the position of the intended interaction (arrow A) and the clamp opening link 82 already moved in the movement path of the clamp 80 (arrow B), as well as the article 83 to be removed and in fact already moved into the movement path of the clamp 80 (arrow C). FIG. 3 is a view of the side of the clamp 80 and FIG. 4 a plan view thereof.

Figure 5:
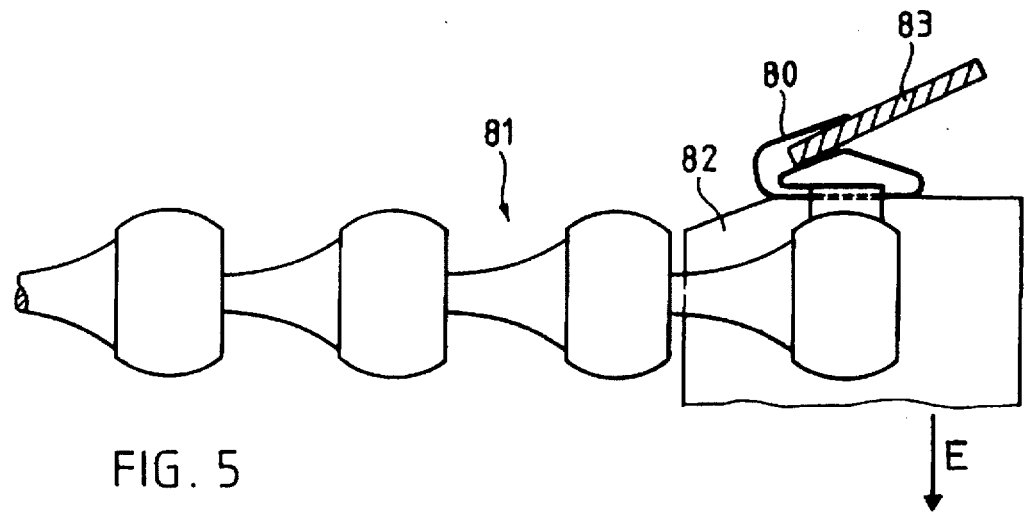
Figure 6:
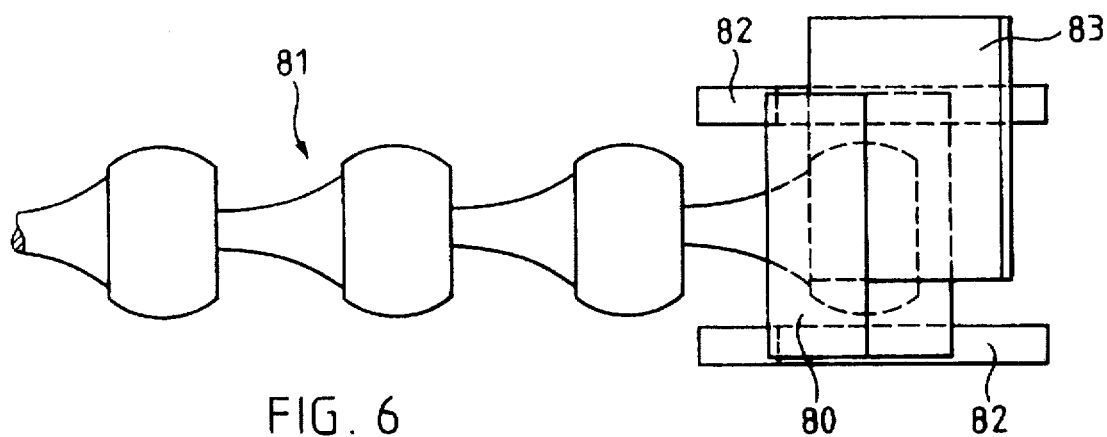

FIGS. 5 and 6 show the same arrangement of ball joint link chain 81, clamp 80, clamp opening link 82 and article 83 to be removed, but at a time at which the head end of the chain 81 has reached the intended position, the clamp 80 has opened by running against the link 82 and the article 83 is positioned in the clamp 80. The views are the same as in FIGS. 3 and 4. Arrow E indicates a further movement with which the link 82 is removed from the area of the clamp 80 in order to close the latter around the article 83.

FIGS. 7 and 8 again show the same arrangement of the ball joint link chain 81, clamp 80, clamp opening link 82 and article 83 to be removed following the closing of the clamp 80 through the moving away of link 82. The views are again the same as in FIGS. 3 and 4. Arrow F indicates the further movement of the head end of the conveying member 81 for conveying away the article 83.

The interaction means shown in FIGS. 3 to 8 are only located in the vicinity of the position, i.e. there are no interaction means at the head end of the conveying member, so that through the latter there is no need to provide a line for control pulses, etc. The clamp 80 is a purely passive holding means.

Figure 7:
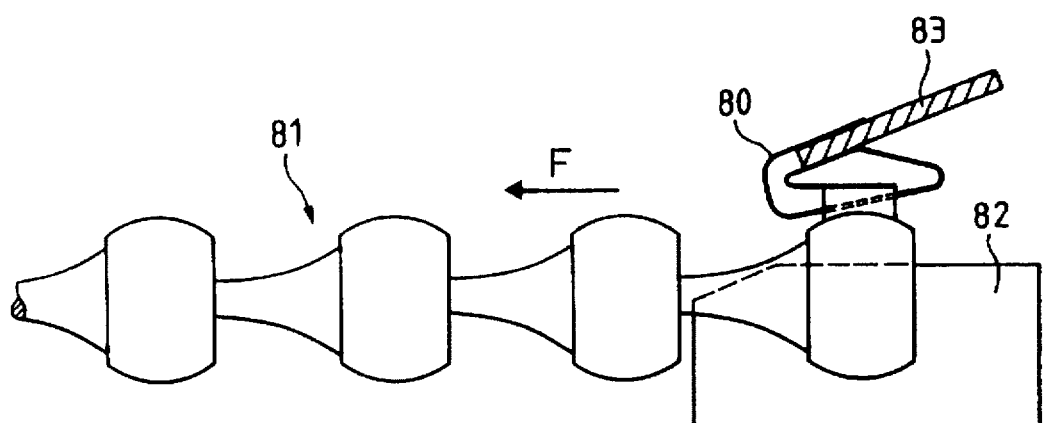

FIGS. 3, 5 and 7 make it clear that the clamp opening link 82 must be moved for an interaction into the movement path of the clamp 80 in such a way that only at the predetermined position is the clamp opened, while on its path to said position the clamp 80 passes through the most varied, other positions and their interaction means (clamp opening link 82), without the clamp 80 opening. This also applies with regards to the article 83 to be removed. The article can e.g. be the top article of a stack of such articles located at the position and as a result of a corresponding removal order is moved laterally at least partly from the stack into the movement path of the clamp 80.

Figure 8:
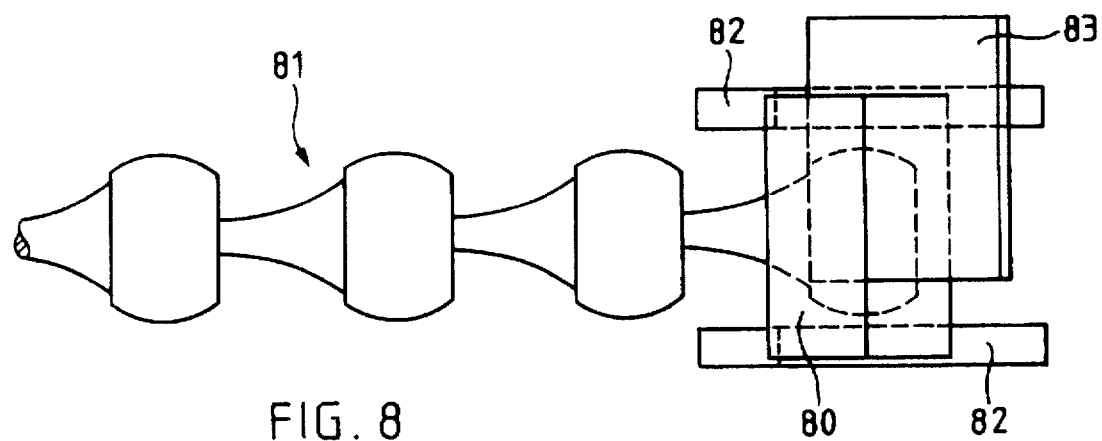

FIGS. 4, 6 and 8 make it clear that the article can be moved from positions on either side of the clamp 80 to a point where it can be grasped by the clamp 80. Thus, it is possible for such an embodiment of the holding and interaction means to provide facing positions relative to the guidance of the conveying member 81 and such positions can have common clamp opening links 82.

On the head end of the ball joint link chain 81 or on the underside of the clamp can be provided a distance sensor, which can be used for producing a stop instruction for a chain movement in such a way that it detects the clamp opening link 82 shoved into the movement path of the clamp from a certain distance. In a system equipped in this way there is no need for a control of the drive operating over a distance to be covered by the head end.

I claim:

1. A commissioning system comprising
   an array of positions (1 to 53) randomly distributed in a space for receiving articles to be removed, each said position being associated with a specific article and having a removal side;
   at least one outlet point (65) in said system;
   a removing device for the controlled removal of articles from the removal side of said positions and for conveying removed articles to said at least one outlet point (65) of said system, said removal device comprising
      a guidance system (60) extending from said at least one outlet point (65) to said removal sides of all of said positions,
      at least one flexible conveying member (67) movable in a push and pull manner in said guidance system (60), and
      a drive for pushing and pulling said conveying member so that a head end of said conveying member is movable from said outlet point to said removal side of each position;
   holding means at said head end of said at least one conveying member for holding an article;
   interaction means for transferring articles from each position to said holding means (68); and
   a computer for producing control signals for controlling said system, said computer comprising a memory (74) containing data identifying correlations between said positions and features of articles and between conveying data and said positions.

2. A system according to claim 1 wherein said system includes a plurality of outlet points, and wherein said head end of said conveying member is movable from an outlet point farthest from said outlet points to said removal side of each position.

3. A system according to claim 1 wherein said interaction means is on said head end of said conveying member.

4. A system according to claim 1 wherein said interaction means is on said removal side of each said position.

5. A system according to claim 1 wherein said guidance system (60) is branched in a tree-like manner and comprises settable switch points (61–64) at branching locations.

6. A system according to claim 1 wherein said system comprises an inlet point and wherein said interaction means includes means for transferring articles from said holding means to each position.

7. A system according to claim 6 wherein said computer comprises an input location for inputting to said computer data about features of articles to be handled.

8. A system according to claim 6 including a sensor at said input location for reading and providing to said computer data about features of articles to be handled.

9. A system according to claim 6 including interaction means at said outlet point and said inlet point.

10. A system according to claim 1 wherein said guidance system has two parts, said conveying member comprises two head ends and is movable in said push and pull manner so that each head is movable in any position of one part of said guidance system, said guidance system including guides to said array of positions, said at least one outlet point and said drive for pushing and pulling being located between said two parts.

11. A system according to claim 1 wherein said positions of said array of positions are all on one side of said guides.

12. A system according to claim 1 wherein said positions of said array of positions are arranged on predetermined sides of said guides.

13. A system according to claim 1 wherein each said holding means (68) comprises a clamp (80) and spring means urging said clamp to a closed position, and wherein each said interaction means comprises a link for opening said clamp, each said link being located adjacent a removal side of a position and being movable into a path of a clamp, said system also including a positioning means adjacent each removal side for positioning one or more articles in a clamping area of an opened clamp.

14. A system according to claim 1 which includes inlet and outlet points (65, 66) and a conveying member store (70),
   wherein said conveying member comprises a ball joint link chain (81), and
   wherein said drive comprises a drivable gear shaped to match ball joint links of said chain, said chain engaging said gear between said store and said inlet and outlet points.

15. A system according to claim 1 comprising a delivery system or library.

* * * * *